United States Patent
Matsumoto

(10) Patent No.: US 11,824,405 B2
(45) Date of Patent: Nov. 21, 2023

(54) ROTOR OF ROTARY ELECTRIC MACHINE

(71) Applicant: TOYOTA JIDOSHA KABUSHIKI KAISHA, Toyota (JP)

(72) Inventor: Takashi Matsumoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 24 days.

(21) Appl. No.: 17/647,204

(22) Filed: Jan. 6, 2022

(65) Prior Publication Data
US 2022/0216755 A1    Jul. 7, 2022

(30) Foreign Application Priority Data

Jan. 7, 2021  (JP) .................. 2021-001393

(51) Int. Cl.
*H02K 1/27*    (2022.01)
*H02K 1/28*    (2006.01)
*H02K 1/276*   (2022.01)

(52) U.S. Cl.
CPC ............ *H02K 1/28* (2013.01); *H02K 1/276* (2013.01)

(58) Field of Classification Search
CPC ......... H02K 1/28; H02K 1/276; H02K 1/2766
See application file for complete search history.

(56) References Cited

U.S. PATENT DOCUMENTS

| | | | |
|---|---|---|---|
| 8,970,085 B2 * | 3/2015 | Takahashi | H02K 1/276 310/216.118 |
| 2017/0317544 A1 * | 11/2017 | Watanabe | H02K 1/276 |

FOREIGN PATENT DOCUMENTS

| | | |
|---|---|---|
| JP | 2007181254 A | 7/2007 |
| JP | 2012191750 A | 10/2012 |
| JP | 2016005419 A | 1/2016 |
| JP | 2016092984 A | 5/2016 |
| WO | 2018131402 A1 | 7/2018 |
| WO | 2018163319 A1 | 9/2018 |
| WO | WO-2018163319 A1 * | 9/2018 |

\* cited by examiner

*Primary Examiner* — Thomas Truong
(74) *Attorney, Agent, or Firm* — HUNTON ANDREWS KURTH LLP

(57) ABSTRACT

A rotary electric machine rotor includes a rotor core having magnet holes formed therein, a permanent magnet inserted in each of the magnet holes, and an end plate arranged at an axial end face of the rotor core and having one or more fixing holes via which the permanent magnet is exposed to the outside in an axial direction. One or more fixing pieces extend from the periphery of the fixing hole. The fixing piece has an inclined part that extends in a direction approaching the center of the permanent magnet when advancing to the outside in the axial direction, and is in contact with the permanent magnet, thereby pressing the permanent magnet in both the axial direction and a lateral direction orthogonal to the axial direction.

8 Claims, 9 Drawing Sheets

ROTOR OF ROTARY ELECTRIC MACHINE

CROSS REFERENCE TO RELATED APPLICATION

This application claims priority to Japanese Patent Application No. 2021-001393 filed on Jan. 7, 2021, which is incorporated herein by reference in its entirety including the specification, claims, drawings, and abstract.

TECHNICAL FIELD

This application discloses a rotor of a permanent magnet type rotary electric machine having permanent magnets embedded inside a rotor core.

BACKGROUND

Conventionally, a rotor having permanent magnets inserted and fixed in magnet holes formed inside a rotor core is known. As a structure for fixing permanent magnets, there is a structure in which the clearance between the magnet hole and the permanent magnet is filled with a resin or the like. Such a structure can reliably fix the permanent magnets, but manufacturing processes tend to be complicated. One of various conventional techniques proposed in view of this is a structure in which end plates arranged at both axial ends of the rotor core are used to fix the permanent magnets in the magnet holes.

For example, Patent Literature 1 discloses a technique in which end plates are bent and deformed toward the magnet hole side (i.e., inner side in the axial direction) at portions corresponding to magnet holes to form claw-shaped protrusions. When a direction orthogonal to the axial direction of the rotor is defined as a "lateral direction", the protrusions are provided on both sides of the permanent magnet in the lateral direction, and the permanent magnet is sandwiched between a pair of protrusions. With this arrangement, the movement of the permanent magnet in the lateral direction can be restricted.

CITATION LIST

Patent Literature

Patent Literature 1: JP 2016-005419 A

However, the structure disclosed in Patent Literature 1 requires arranging one end plate at one axial end of the rotor core, then inserting the permanent magnet into the magnet hole, and subsequently arranging another end plate at the other axial end of the rotor core. According to such an arrangement of the end plates, or at the time of inserting the permanent magnets, the protrusions move in the axial direction while keeping tight contact with peripheral surfaces of the permanent magnets, and therefore the permanent magnets may be cracked or scratched due to friction.

Accordingly, this application discloses a rotary electric machine rotor capable of easily fixing permanent magnets while preventing the permanent magnets from being damaged.

SUMMARY

A rotor of a rotary electric machine disclosed in this application includes a rotor core having one or more magnet holes each being formed so as to extend in an axial direction, a permanent magnet inserted in each of the one or more magnet holes, and one or more end plates each being arranged at an axial end face of the rotor core, as one or more end plates each being provided with one or more fixing holes via which the permanent magnet is exposed to the outside in the axial direction, wherein one or more fixing pieces extend from the periphery of the fixing hole, with a fixing piece having an inclined part that extends in a direction approaching the center of the permanent magnet when advancing to the outside in the axial direction and being in contact with the permanent magnet, thereby pressing the permanent magnet in both the axial direction and a lateral direction orthogonal to the axial direction.

With such a configuration, the contact area between the fixing piece and the permanent magnet, and thus the friction, can be reduced, and the permanent magnet can be effectively prevented from being damaged. Further, the inclined part presses the permanent magnet in both the axial direction and the lateral direction, and therefore the permanent magnet can be reliably positioned in both the axial direction and the lateral direction. As a result, it is possible to easily fix the permanent magnet while preventing the permanent magnet from being damaged.

In this case, the fixing pieces may be positioned on both sides of the permanent magnet intervening therebetween in the lateral direction, and the permanent magnet may be sandwiched by a pair of inclined parts positioned on both sides of the permanent magnet intervening therebetween in the lateral direction.

With such a configuration, the permanent magnet can be naturally positioned at a position where the urging forces of a pair of inclined parts aligned in the lateral direction are balanced.

Further, the end plates may be provided on both sides of the rotor core in the axial direction, and the inclined parts may be present on both sides of each permanent magnet in the axial direction.

With such a configuration, the permanent magnet can be naturally positioned at a position where the urging forces of a pair of inclined parts aligned in the axial direction are balanced.

Further, the magnet hole may have a main part, which larger than the permanent magnet, and a pocket part being a cavity continuous to the main part, and the fixing piece may be provided at a position where at least a part thereof is overlapped with the pocket part in the axial direction.

Depending on a relative positional relationship with the permanent magnet, it may be desired that at least a part of the fixing piece advances axially inward from the end plate. Adopting the above-described configuration enables the pocket part to partly receive the fixing piece advancing axially inward.

Further, the permanent magnet may protrude outward from the end plate in the axial direction, and the fixing piece may linearly extend from the periphery of the fixing hole to a terminating end, without being bent.

Forming the fixing piece so as to have a simple shape is desirable in that the fixing piece can be easily improved in various kinds of accuracies. This leads to improvement in positioning accuracy of the permanent magnet.

Further, an axial end face of the permanent magnet may be positioned axially inside an axial end face of the end plate, and the fixing piece may be bent once or more in a region from a proximal end thereof to a terminating end thereof, so that an axial inner end of the inclined part is positioned more toward the inside in the axial direction than the axial end face of the permanent magnet.

With such a configuration, the axial dimension of the permanent magnet can be prevented from increasing, and the cost can be further reduced.

Further, the rotor core may be configured by a plurality of electro-magnetic steel sheets laminated in the axial direction, and the end plate may be configured by an electro-magnetic steel sheet, which is the same type as the electro-magnetic steel sheets configuring the rotor core.

With such a configuration, the number of component types can be reduced, and the cost can be further reduced.

Further, the end plate may be configured by a non-magnetic material.

With such a configuration, leakage fluxes flowing through the end plate can be reduced, and the efficiency of the rotary electric machine can be further improved.

According to the technique disclosed in this application, it is possible to easily fix the permanent magnets while preventing the permanent magnets from being damaged.

BRIEF DESCRIPTION OF DRAWINGS

Embodiment(s) of the present disclosure will be described based on the following figures, wherein.

DESCRIPTION OF EMBODIMENTS

Figure 1:
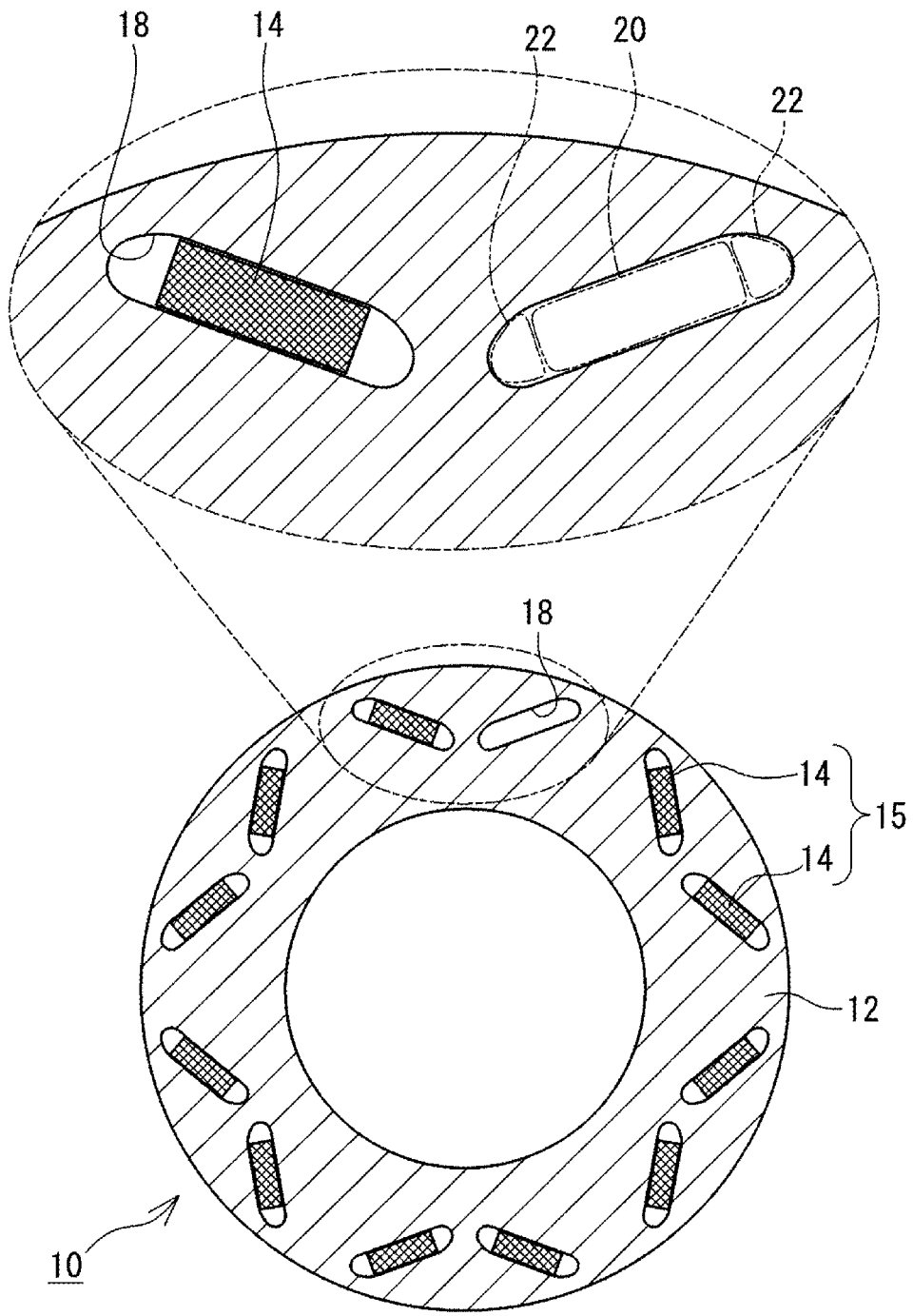
FIG. 1 is a lateral cross-sectional view of an exemplary rotor.
Figure 2:
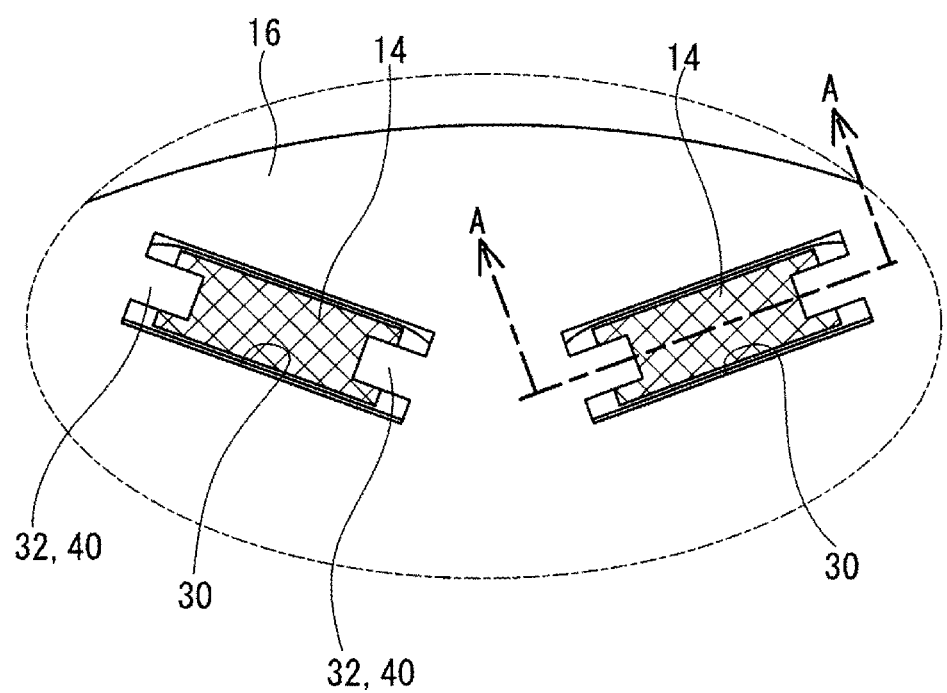
FIG. 2 is a partial view of an end face of the rotor seen from the axial direction.
Figure 3:
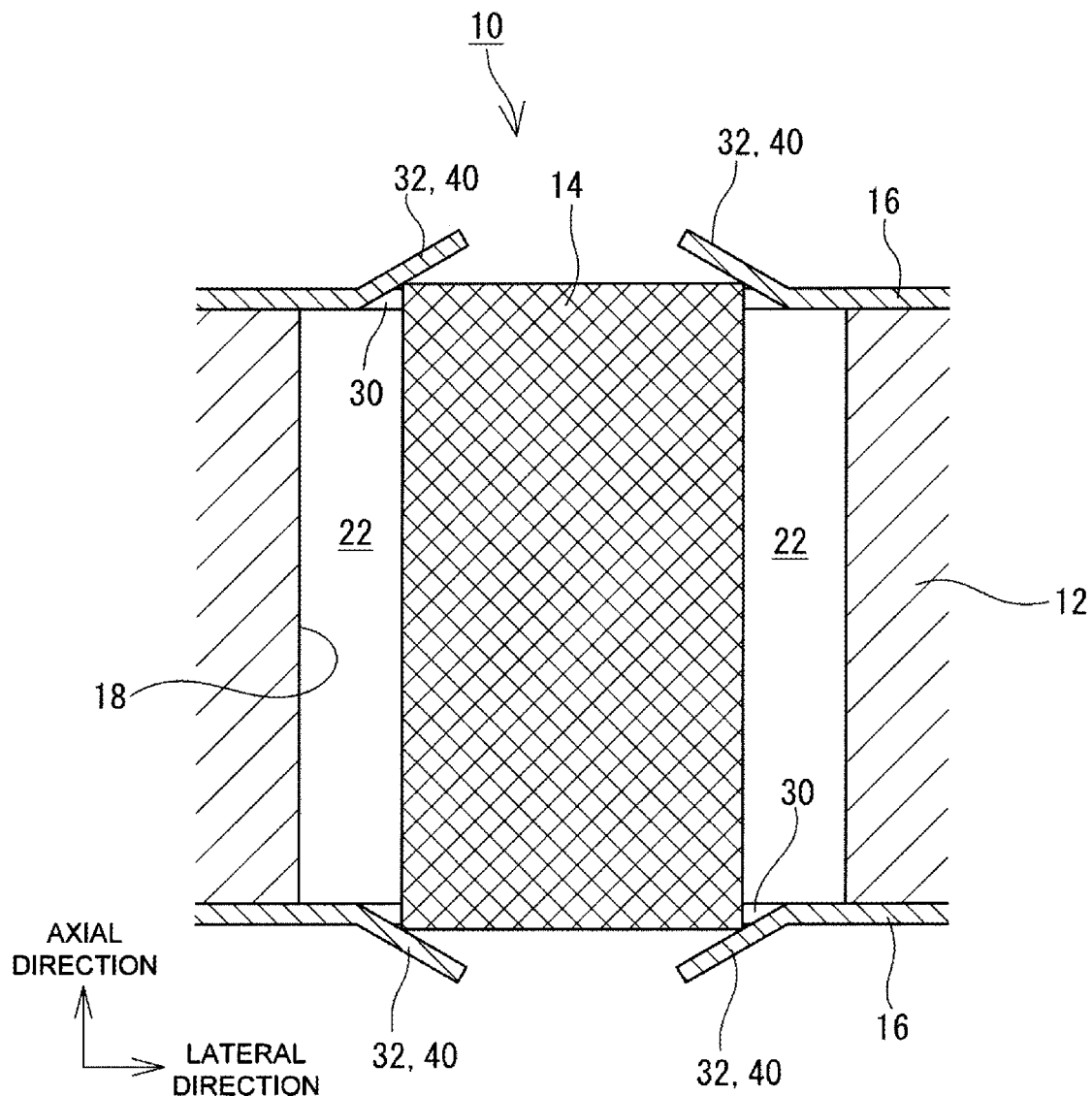
FIG. 3 is a cross-sectional view taken along a line A-A of FIG. 2.

Hereinafter, an exemplary configuration of a rotor 10 will be described with reference to attached drawings. FIG. 1 is a lateral cross-sectional view of the rotor 10. Further, FIG. 2 is a partial view of an end face of the rotor 10 seen from the axial direction, and FIG. 3 is a cross-sectional view taken along a line A-A of FIG. 2. In the following description, unless otherwise mentioned, "axial direction", "radial direction", and "circumferential direction" indicate the axial direction, radial direction, and circumferential direction of the rotor 10, respectively. Further, in the following description, directions orthogonal to the axial direction, such as the radial direction and the circumferential direction, are collectively referred to as "lateral directions".

This rotor 10 is used for a rotary electric machine such as a three-phase synchronous rotary electric machine that serves as a power source of an electrically driven vehicle, for example. The rotor 10 includes a rotor core 12, permanent magnets 14 embedded inside the rotor core 12, and a pair of end plates 16 arranged on both axial ends of the rotor core 12.

The rotor core 12 is substantially a toroid having an axial bore formed in the center thereof. The rotor core 12 is composed of a plurality of electro-magnetic steel sheets (e.g., silicon steel sheets) laminated in the axial direction. In the vicinity of the outer periphery of the rotor core 12, a plurality of magnet holes 18 are arranged side by side at intervals in the circumferential direction. Each magnet hole 18 penetrates in the axial direction and has an inner space in which the permanent magnet 14 configuring a magnetic pole of the rotor 10 is arranged. In order to explain the shape of the magnet hole 18, one magnet hole 18 in which the permanent magnet 14 is not inserted is illustrated in FIG. 1.

In the present example, neighboring permanent magnets 14 are arranged so as to form a V shape. That is, each magnetic pole 15 is configured by a pair of permanent magnets 14 in a V-shaped arrangement, which is widened outward in the radial direction. In the example of FIG. 1, the rotor 10 has twelve permanent magnets 14 that configure six magnetic poles 15. Each permanent magnet 14 has a lateral cross-sectional shape that is a substantially flat rectangular shape, and is magnetized in a minor axis direction thereof. Of the permanent magnets 14, the permanent magnets 14 configuring S magnetic poles are arranged in such a manner that S poles are directed outward in the radial direction, and the permanent magnets 14 configuring N magnetic poles are arranged in such a manner that the N poles are directed outward in the radial direction.

Further, in the present example, the axial dimension of the permanent magnet 14 is larger than the axial dimension of the rotor core 12. Therefore, as illustrated in FIG. 3, an axial end face of the permanent magnet 14 protrudes axially outward from an axial end face of the rotor core 12.

In order to receive the permanent magnets 14 having the V-shaped arrangement, neighboring magnet holes 18 are arranged so as to form a corresponding V shape. That is, the rotor core 12 is provided with the magnet holes 18 in a plurality of pairs (6 pairs in the illustrated example) that are evenly arranged in the circumferential direction, in which each pair of magnet holes 18 is arranged in the V shape that is widened outward in the radial direction. The magnet hole 18 has a substantially rectangular shape and is larger than the permanent magnet 14 in major axis dimension. More specifically, the magnet hole 18 has a main part 20, which is larger than the permanent magnet 14, and pocket parts 22 being cavities continuous to both ends of the main part 20 in the major axis direction. The pocket parts 22 are provided to reduce useless magnetic fluxes not contributing to torque production (so-called leakage fluxes) and increase valid magnetic fluxes.

The end plates 16 are fixed to both axial ends of the rotor core 12. For example, the end plate 16 is configured by an electro-magnetic steel sheet, which is the same type as the electro-magnetic steel sheets configuring the rotor core 12, namely, an electro-magnetic steel sheet that has the same material and dimensions. Such a configuration can reduce the number of components configuring the rotor 10 and accordingly contribute to cost reduction. However, it is needless to say that the end plate 16 may be configured by a plate member different in type from the electro-magnetic steel sheet of the rotor core 12. For example, the end plate 16 may be configured by a non-magnetic material such as brass.

Fixing holes 30 via which the permanent magnets 14 are exposed in the axial direction are formed at positions of the end plates 16 where they are overlapped with the permanent magnets 14 in the axial direction. The number of the provided fixing holes 30 is the same as the number of the permanent magnets 14. Like the permanent magnet 14, each fixing hole 30 has a flat shape elongated in one direction.

Fixing pieces 32 for fixing the permanent magnet 14 extend from the periphery of the fixing hole 30. For example, these fixing pieces 32 are provided on both sides of the permanent magnet 14 in the lateral direction. In the example of FIG. 2, with the permanent magnet 14 intervening therebetween, the fixing pieces 32 are provided on both sides of the permanent magnet 14 in the major axial direction, in other words, at positions where they are overlapped with the pocket parts 22 in the axial direction.

The fixing piece 32 is a cantilever-shaped portion having a proximal end connected to the end plate 16 and a distal end serving as a free end. A part or the whole of the fixing piece 32 functions as an inclined part 40. The inclined part 40 is a portion extending in an inclined direction so as to approach the center of the permanent magnet 14 when advancing to the outside in the axial direction. In the example illustrated in FIGS. 2 and 3, the fixing piece 32 extends linearly from the periphery of the fixing hole 30 to the terminating end, without being bent, so that the fixing piece 32 serves wholly as the inclined part 40.

The inclined part 40 extends in the inclined direction, as mentioned above, and functions as a leaf spring having an appropriate elasticity. This inclined part 40 is in line contact with the periphery of the axial end face of the permanent magnet 14. Further, while being in contact with the permanent magnet 14, the inclined part 40 presses the permanent magnet 14 in both of the axial direction and the lateral direction. As a result, the permanent magnet 14 is automatically positioned and fixed in both the lateral direction and the axial direction, as will be described below. The end plate 16 having the fixing holes 30 and the fixing pieces 32 as described above can be manufactured by press-molding an electro-magnetic steel sheet, for example.

Next, the reason why the fixing holes 30 and the fixing pieces 32 described above are provided will be described by giving a comparison with a comparative example. In general, the magnet hole 18 is larger than the permanent magnet 14. Therefore, it is necessary to position and fix the permanent magnet 14 in the magnet hole 18. For this fixing, a structure in which the clearance between the magnet hole 18 and the permanent magnet 14 is filled with a resin or the like is known. However, such a fixing structure using a resin or the like encounters a problem that processes for manufacturing the rotor 10 are complicated and time-consuming.

In view of the above, there is a proposed structure in which the end plates 16 are used to fix the permanent magnets 14. For example, as will be understood from a comparative example illustrated in FIG. 9, there is a known structure in which protrusions 50 are formed by partly bending the end plates 16 inward in the axial direction so that the protrusions 50 are provided on both sides of the permanent magnet 14 in the lateral direction. According to this structure, attaching the end plates 16 to the rotor core 12 can fix the permanent magnets 14. Therefore, the manufacturing processes can be simplified.

Figure 9:
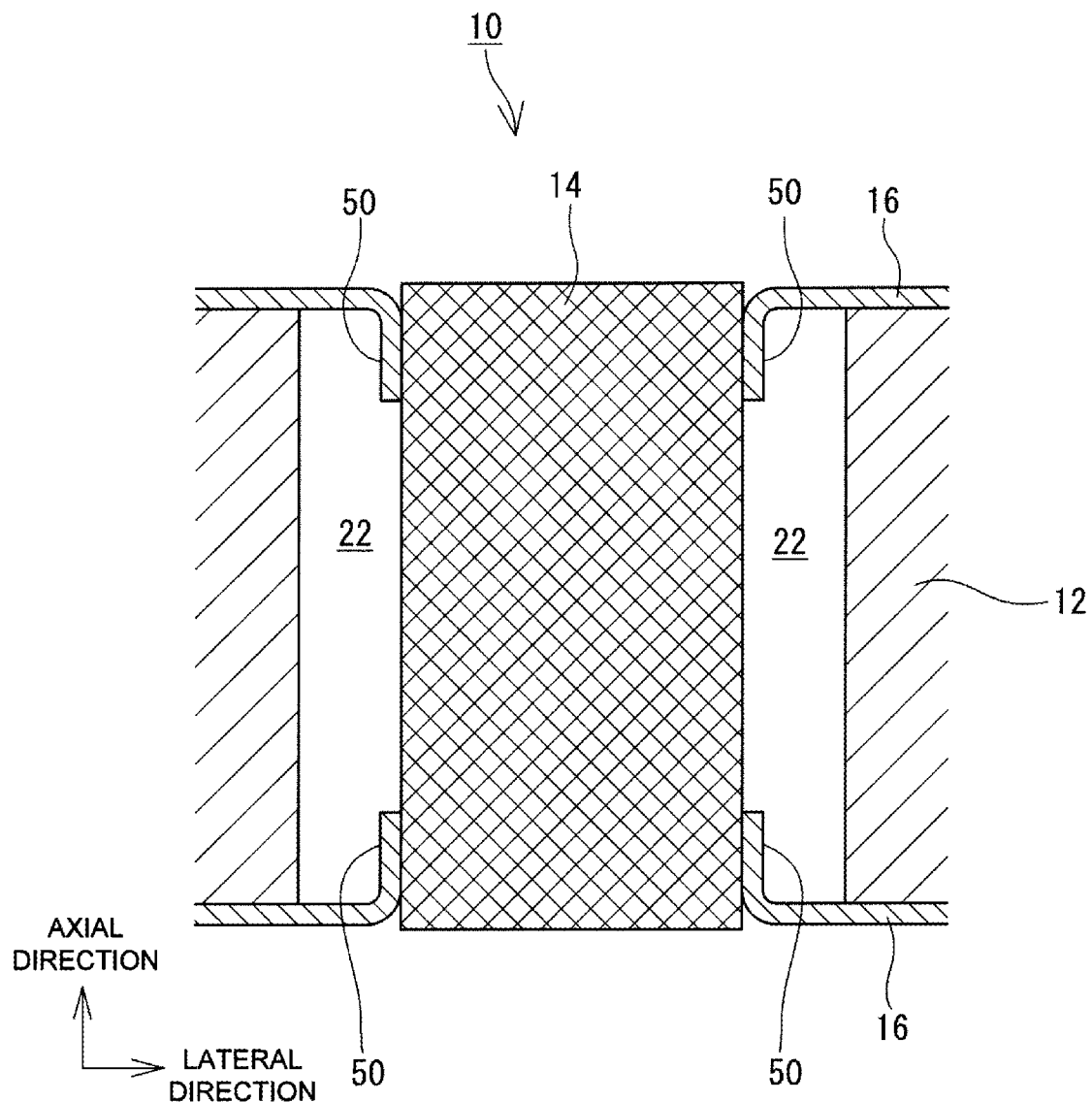
FIG. 9 is a vertical cross-sectional view of a comparative rotor.

However, the comparative example of FIG. 9 is such that the protrusions 50 press the permanent magnet 14 only in the lateral direction. Therefore, although the permanent magnet 14 can be sufficiently fixed in the lateral direction, it may not be sufficiently fixed in the axial direction. Further, in the comparative example, the protrusions 50 are in planar contact with the permanent magnet 14. Therefore, in the comparative example, if the end plates 16 are configured by a magnetic material, leakage of fluxes thorough the end plates 16 will increase and the efficiency of the rotary electric machine will decrease. Therefore, in the case of the comparative example, the end plate 16 needs to be configured by a non-magnetic material. This causes an increase in the number of component types.

In addition, when manufacturing the rotor 10 of FIG. 9, one end plate 16 is attached to one axial end side (e.g., the lower side of the paper in FIG. 9) of the rotor core 12 and then the permanent magnet 14 is attached in the magnet hole 18 from one axial end side. Further, subsequently, another end plate 16 is attached to the other axial end side (e.g., the upper side of the paper in FIG. 9) of the rotor core 12. According to such an arrangement of the end plates 16, or at the time of inserting the permanent magnet 14, the protrusions 50 move relatively in the axial direction while keeping the tight contact with peripheral surfaces of the permanent magnet 14. As a result, the permanent magnet 14 may be cracked or scratched due to friction between the protrusions 50 and the permanent magnet 14.

On the other hand, in the rotor 10 of the present example, the fixing pieces 32 (the inclined parts 40) extend in the inclined direction so as to approach the center of the permanent magnet 14 when advancing to the outside in the axial direction, and are in line contact with the permanent magnet 14. Therefore, the fixing pieces 32 can press the permanent magnet 14 in both the axial direction and the lateral direction. As a result, the fixing pieces 32 can fix the permanent magnet 14 not only in the lateral direction but also in the axial direction.

Further, at this time, the fixing pieces 32 are in contact with only the periphery of the axial end face of the permanent magnet 14. This means that the contact area between the end plate 16 including the fixing piece 32 and the permanent magnet 14 can be kept smaller. As a result, even if the end plate 16 is configured by a magnetic material, for example, by an electro-magnetic steel sheet of the same type as the electro-magnetic steel sheets configuring the rotor core 12, the leakage flux can be kept smaller.

Figure 4:
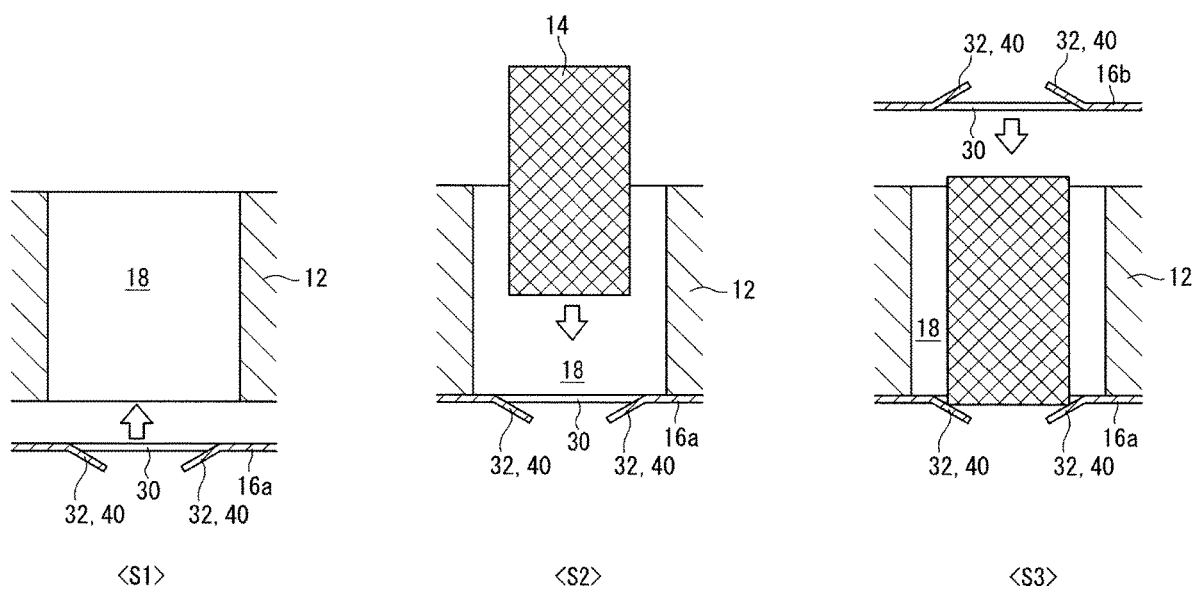
FIG. 4 is a conceptual diagram illustrating a manufacturing flow of the rotor.

Further, in the case of the rotor 10 of the present example, during the manufacturing processes, there is no chance that the fixing pieces 32 will slide while keeping planar contact with the permanent magnet 14. Accordingly, the permanent magnet 14 can be effectively prevented from being damaged. This will be described with reference to FIG. 4. FIG. 4 is a conceptual diagram illustrating a manufacturing flow of the rotor 10.

As illustrated in FIG. 4, in step S1, a first end plate 16a is fixed to one axial end side of the rotor core 12 (the lower side of the paper in the illustrated example). However, this fixing may be a final fixing or may be a temporary fixing. For example, this fixing may be chemical reaction based fixing using an adhesive or the like or may be mechanical engagement based fixing such as caulking.

Subsequently, in step S2, the permanent magnet 14 is inserted into the magnet hole 18 from the other axial end side of the rotor core 12 (the upper side of the paper in the illustrated example). When the insertion is completed, one axial end face of the permanent magnet 14 is in line contact with the fixing pieces 32 of the first end plate 16a. On the other hand, in an insertion process, the permanent magnet 14 can advance through the magnet hole 18 without contacting the fixing pieces 32. As a result, in the process of inserting the permanent magnet 14, the permanent magnet 14 is not damaged by the fixing pieces 32.

Next, in step S3, a second end plate 16b is fixed to the other axial end side of the rotor core 12 (the upper side of the paper in the illustrated example). With this arrangement, the other axial end face of the permanent magnet 14 is brought into contact with the fixing pieces 32 of the second end plate 16b, but this contact is a line contact and therefore the friction is very small. Accordingly, at the time of fixing the second end plate 16b, there is no chance that the permanent magnet 14 will be damaged by the fixing pieces 32. Finally, an axial compression force (so-called axial force) is applied to the entire rotor 10 including the end plates 16, thereby completing the manufacturing of the rotor 10. Upon application of this axial force, two fixing pieces 32 axially aligned with the permanent magnet 14 intervening therebetween come close to each other. With such a configuration, an increased urging force is applied to the permanent magnet 14 from the fixing pieces 32, and the permanent magnet 14 can be firmly fixed.

As will be apparent from the above description, in the present example, the end plates 16 having the fixing pieces 32 formed thereon are fixed to axial end faces of the rotor core 12. Accordingly, the permanent magnet 14 can be fixed in both the axial direction and the lateral direction. Further, at the time of this fixing, the contact between the permanent magnet 14 and the fixing pieces 32 can be kept small, and therefore the permanent magnet 14 can be effectively prevented from being damaged. That is, according to this example, it is possible to easily fix the permanent magnet 14 while preventing the permanent magnet 14 from being damaged.

Figure 5:
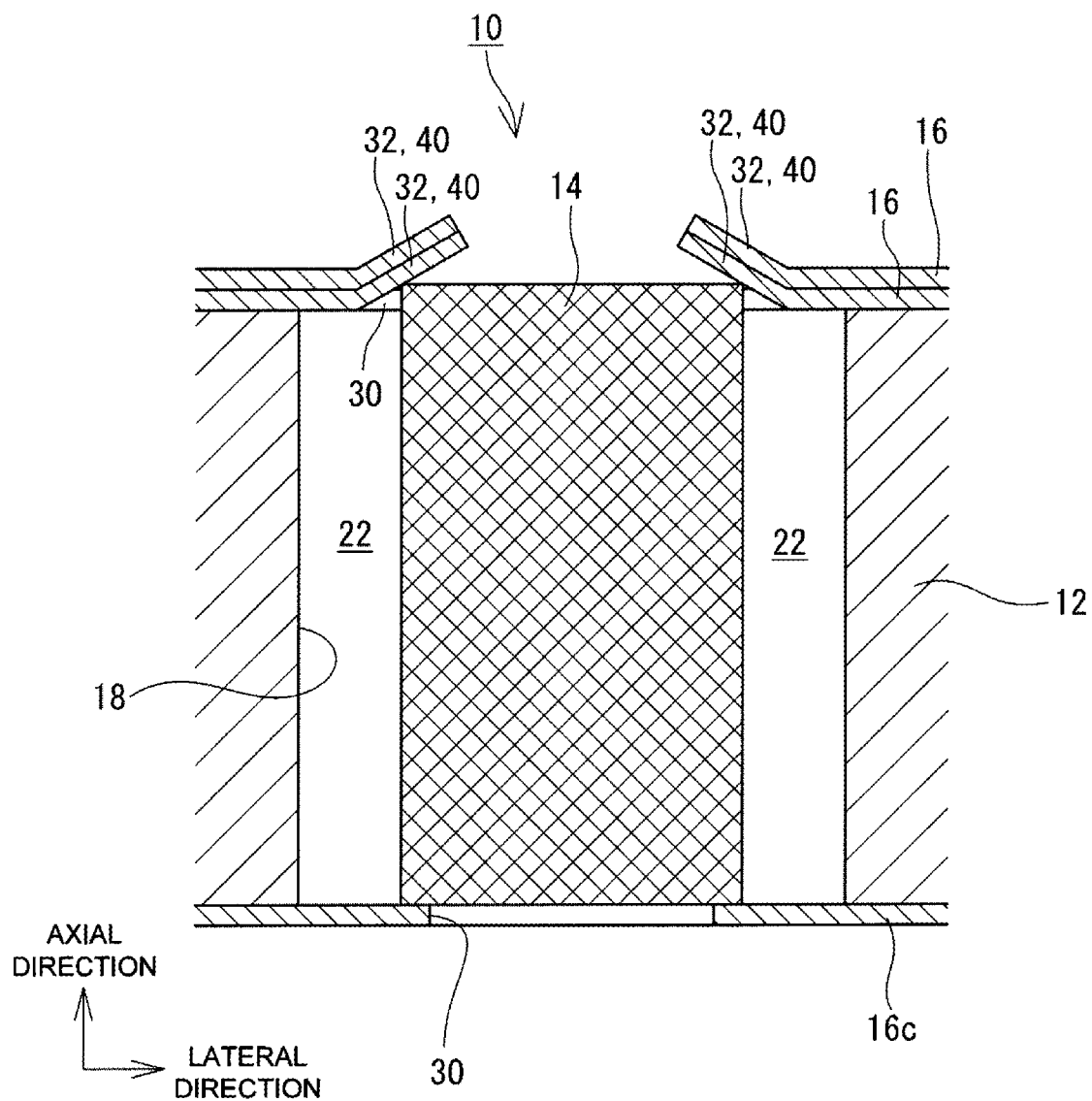
FIG. 5 is a vertical cross-sectional view of another exemplary rotor.

The above-described configuration is merely an example. As long as the end plate 16 has the fixing piece 32 extending from the periphery of the fixing hole 30 and the fixing piece 32 has the inclined part 40 extending in a direction approaching the center of the permanent magnet 14 when advancing to the outside in the axial direction and is brought into contact with the permanent magnet 14, other configurations may be changed appropriately. For example, the number of the end plates 16 arranged at axial end faces of the rotor core 12 may be changed appropriately. Accordingly, as illustrated in FIG. 5, two or more end plates 16, namely, the inclined parts 40, may be arranged in a laminated manner on one axial end side of the rotor core 12 (the upper side of the paper in FIG. 5). With such a configuration, the urging force to be generated by the inclined part 40 can be increased and the permanent magnet 14 can be further firmly fixed.

Further, it suffices that the end plate 16 having the fixing piece 32 is provided at least at one axial end face of the rotor core 12, and the fixing piece 32 need not be provided on the other axial end face. That is, as illustrated in FIG. 5, an end plate 16c that does not have the fixing piece 32 may be arranged on the other axial end side of the rotor core 12 (the lower side of the paper in FIG. 5). In this case, the end plate 16c is only required to prevent the permanent magnet 14 from coming off. Accordingly, the end plate 16c may have a fixing hole 30 that is a size smaller than the permanent magnet 14, or need not have the fixing hole 30.

Figure 6:
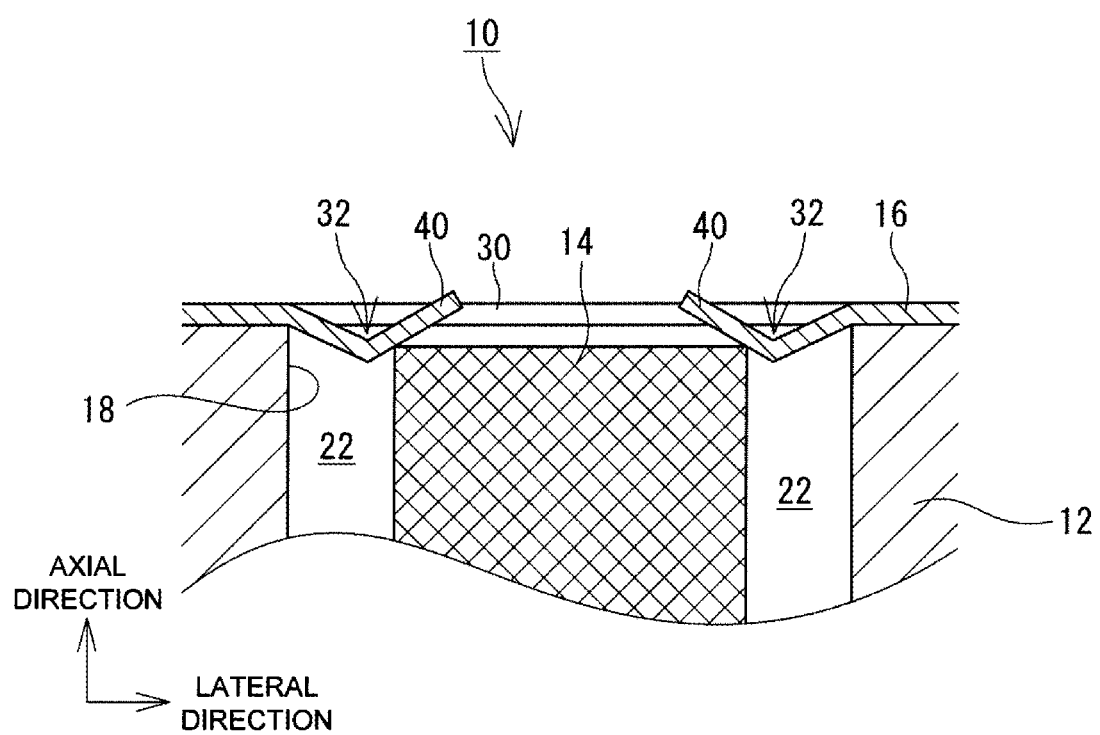
FIG. 6 is a vertical cross-sectional view of another exemplary rotor.

Further, in the above description, the fixing piece 32 extends linearly from its proximal end to its terminating end without being bent. However, the fixing piece 32 may be bent once or more at an intermediate part thereof as long as it has the inclined part 40. For example, as illustrated in FIG. 6, the fixing piece 32 may have a substantially V shape so that it advances inward once in the axial direction from the periphery of the fixing hole 30 and then bends outward in the axial direction. In this case, a portion extending outward in the axial direction and in a direction approaching the center of the permanent magnet 14, after bending, functions as the inclined part 40. With such a configuration, even in a case where the axial end face of the permanent magnet 14 is positioned axially inside the end plate 16, the inclined part 40 can be brought into contact with the permanent magnet 14 and the permanent magnet 14 can be fixed. In other words, bending the fixing piece 32 can reduce the dimensions of the permanent magnet 14. This leads to a reduction in the cost.

Forming the fixing piece 32 extending inward in the axial direction from the end plate 16 as illustrated in FIG. 6 requires provision of a cavity for receiving the fixing piece 32 on the rotor core 12 side. However, specially providing such a cavity is not preferable for the rotor 10 in that magnetic characteristics deteriorate and the mechanical strength reduces. Therefore, in the case of forming the fixing piece 32 extending inward in the axial direction from the end plate 16, the fixing piece 32 may be provided at an end of the fixing hole 30 in the major axis direction so that the fixing piece 32 is positioned so as to be overlapped with the pocket part 22 of the magnet hole 18 in the axial direction. The pocket part 22 is a cavity that is also formed in a conventional rotor in order to reduce the leakage flux. Providing the fixing piece 32 so as to enter the pocket part 22 does not require the formation of an extra cavity. As a result, the deterioration in magnetic characteristics and the reduction in mechanical strength can be prevented.

Figure 7:
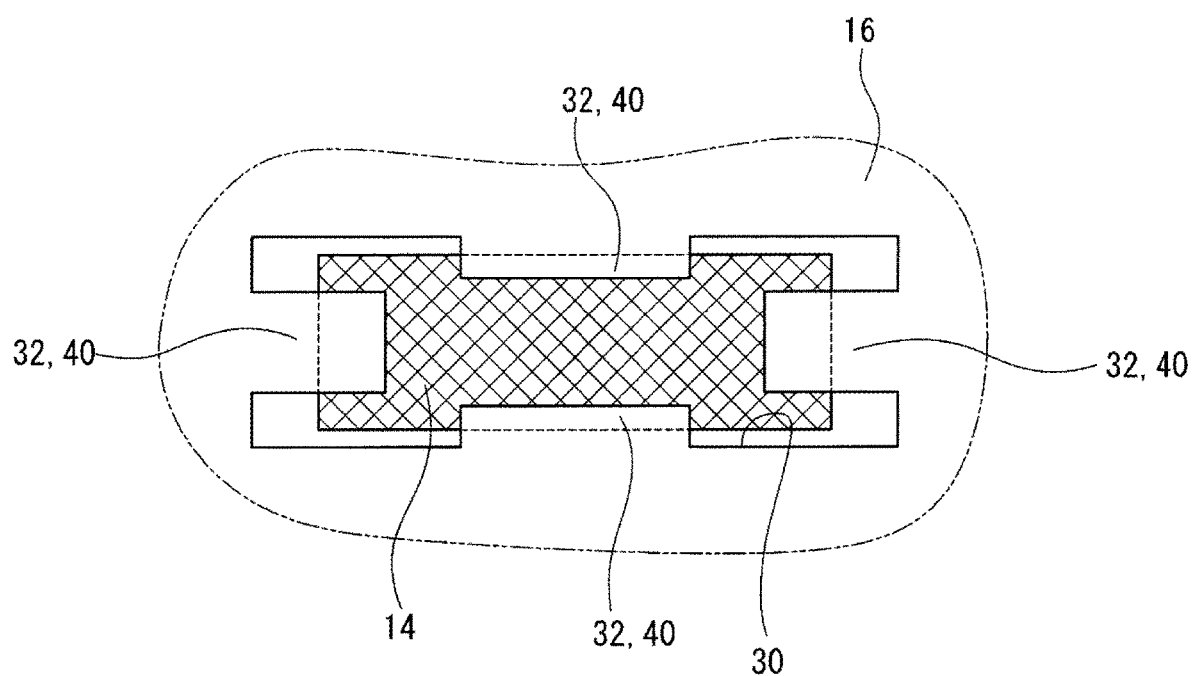
FIG. 7 is a partial view of an end face of another exemplary rotor seen from the axial direction.

Further, in the above description, the fixing pieces 32 are provided on both sides of the permanent magnet 14 intervening therebetween in the lateral direction. In other words, in the above description, two fixing pieces 32 are provided in one fixing hole 30. However, it suffices that one fixing hole 30 is provided with one or more fixing pieces 32 and the number of the fixing pieces 32 is not particularly limited. For example, as illustrated in FIG. 7, a total of four fixing pieces 32 may be provided, in which two fixing pieces 32 may be arranged in the major axis direction with the permanent magnet 14 intervening therebetween and another two fixing pieces 32 may be arranged in the minor axis direction with the permanent magnet 14 intervening therebetween. With such a configuration, the permanent magnet 14 can be reliably fixed not only in the major axis direction but also in the minor axis direction.

Figure 8:
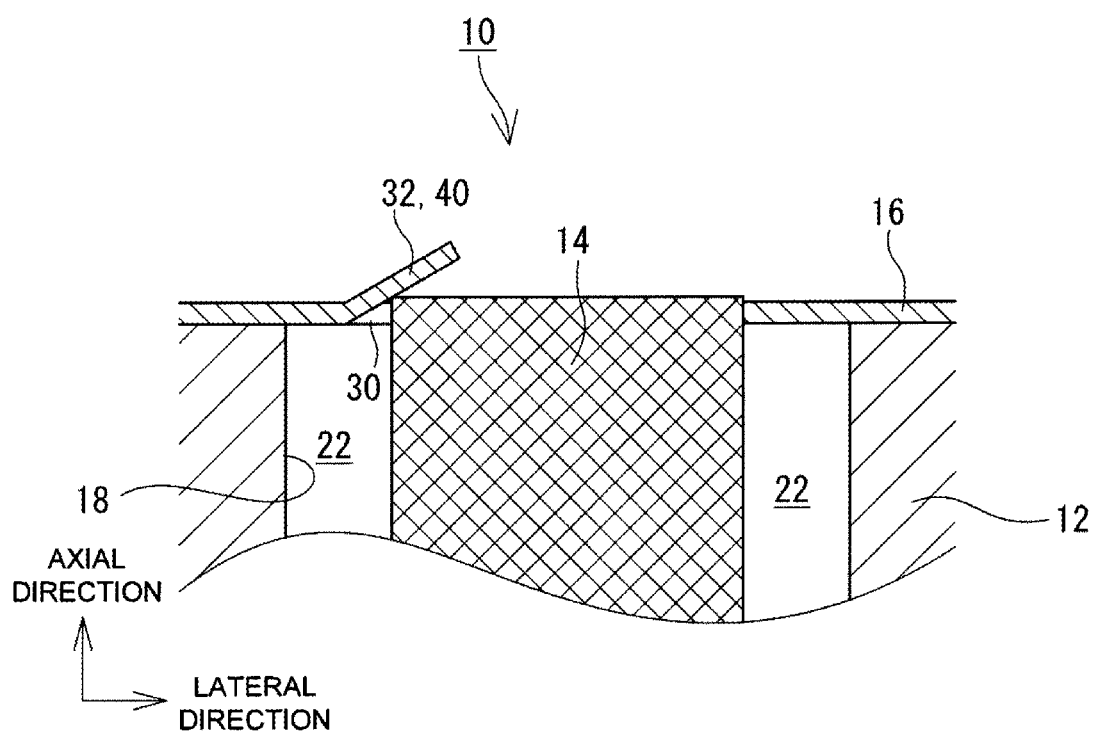
FIG. 8 is a vertical cross-sectional view of another exemplary rotor.

Further, as another embodiment, one fixing hole 30 may be provided with only one fixing piece 32 as illustrated in FIG. 8. In this case, the fixing piece 32 can position the permanent magnet 14 by pressing the permanent magnet 14 against the periphery of the fixing hole 30 on the opposite side of the fixing piece 32.

Further, the rotor core 12 and the permanent magnet 14 may have other configurations appropriately modified. For example, the number and arrangement of the permanent magnets 14 may be appropriately changed. Accordingly, the permanent magnets 14 are not limited to the V shape arrangement, and straight line arrangement or arc-shaped arrangement may be adopted. Further, the rotor core 12 may be configured by a powder magnetic core formed by compressing magnetic powder, instead of a laminated steel sheet formed by laminating a plurality of electro-magnetic steel sheets.

REFERENCE SIGNS LIST

10: Rotor
12: Rotor core
14: Permanent magnet
15: Magnetic pole
16: End plate
18: Magnet hole
20: Main part
22: Pocket part 30: Fixing hole
32: Fixing piece
40: Inclined part
50: Protrusion

The invention claimed is:

1. A rotor of a rotary electric machine, comprising:
a rotor core having one or more magnet holes each being formed so as to extend in an axial direction;
a permanent magnet inserted in each of the one or more magnet holes; and
one or more end plates each being arranged at an axial end face of the rotor core, as one or more end plates each being provided with one or more fixing holes via which the permanent magnet is exposed to the outside in the axial direction,
wherein one or more fixing pieces extend from the periphery of the fixing hole, and
the fixing piece has an inclined part that extends in a direction approaching the center of the permanent magnet when advancing to the outside in the axial direction and is in contact with the permanent magnet, thereby pressing the permanent magnet in both the axial direction and a lateral direction orthogonal to the axial direction,
the fixing pieces include a pair of first fixing pieces positioned on both sides of the permanent magnet in a major axis direction with the permanent magnet intervening therebetween and a pair of second fixing pieces positioned on both sides of the permanent magnet in a minor axis direction with the permanent magnet intervening therebetween, and
the permanent magnet is sandwiched by a pair of inclined parts positioned on both sides of the permanent magnet in the major axis direction with the permanent magnet intervening therebetween, and by a pair of inclined parts positioned on both sides of the permanent magnet in the minor axis direction with the permanent magnet intervening therebetween.

2. The rotary electric machine rotor according to claim 1, wherein
the end plates are provided on both sides of the rotor core in the axial direction, and
the inclined parts are present on both sides of each permanent magnet in the axial direction.

3. The rotary electric machine rotor according to claim 1, wherein
the magnet hole has a main part, which is larger than the permanent magnet, and a pocket part being a cavity continuous to the main part, and
the first fixing piece is provided at a position where at least a part thereof is overlapped with the pocket part in the axial direction.

4. The rotary electric machine rotor according to claim 1, wherein
the permanent magnet protrudes outward from the end plate in the axial direction, and
the fixing piece linearly extends from the periphery of the fixing hole to a terminating end, without being bent.

5. The rotary electric machine rotor according to claim 1, wherein
an axial end face of the permanent magnet is positioned axially inside an axial end face of the end plate, and
the fixing piece is bent once or more in a region from a proximal end thereof to a terminating end thereof, so that an axial inner end of the inclined part is positioned further inward in the axial direction than the axial end face of the permanent magnet.

6. The rotary electric machine rotor according to claim 1, wherein the rotor core is configured by a plurality of electro-magnetic steel sheets laminated in the axial direction, and the end plate is configured by an electro-magnetic steel sheet, which is of same type as the electro-magnetic steel sheets configuring the rotor core.

7. The rotary electric machine rotor according to claim 1, wherein the end plate is configured by a non-magnetic material.

8. The rotary electric machine rotor according to claim 1, wherein
an axial end face of the permanent magnet is positioned axially inside an axial end face of the end plate, and
the fixing piece has a substantially V shape, advancing inward once in an axial direction from the periphery of the fixing hole to a position further inward in the axial direction than the axial end face of the permanent magnet, and then bending outward in the axial direction.

* * * * *